(12) United States Patent
Zomok et al.

(10) Patent No.: US 11,144,874 B1
(45) Date of Patent: Oct. 12, 2021

(54) PRODUCT RETURNS PROCESSING SYSTEM INCLUDING RETURN ADDRESS DETERMINATION BASED UPON DISPOSITION AND PRODUCT AVAILABILITY AND CONDITION AND RELATED METHODS

(71) Applicant: INMAR Rx SOLUTIONS, INC., Ft. Worth, TX (US)

(72) Inventors: Robert Zomok, Advance, NC (US); Julie Goodman, Clemmons, NC (US); Kenneth Bays, Lewisville, NC (US); Brian Rogers, Greensboro, NC (US); Seth Maxwell, Lewisville, NC (US); Caleb Brown, Winston Salem, NC (US); Jacob Bowman, High Point, NC (US); Elizabeth Stewart, Greensboro, NC (US)

(73) Assignee: INMAR RX SOLUTIONS, INC., Ft. Worth, TX (US)

( * ) Notice: Subject to any disclaimer, the term of this patent is extended or adjusted under 35 U.S.C. 154(b) by 440 days.

(21) Appl. No.: 15/917,215

(22) Filed: Mar. 9, 2018

(51) Int. Cl.
 G06Q 10/08 (2012.01)
 G06Q 30/06 (2012.01)
 G06Q 20/32 (2012.01)

(52) U.S. Cl.
 CPC ....... *G06Q 10/0837* (2013.01); *G06Q 10/087* (2013.01); *G06Q 20/32* (2013.01); *G06Q 30/0641* (2013.01)

(58) Field of Classification Search
 CPC .. G06Q 10/0837; G06Q 10/087; G06Q 20/32; G06Q 30/0641
 See application file for complete search history.

(56) References Cited

U.S. PATENT DOCUMENTS

2003/0195778 A1* 10/2003 Smith ............... G06Q 10/06
 705/28
2013/0282597 A1  10/2013 Martin
 (Continued)

FOREIGN PATENT DOCUMENTS

WO  2012178047 A1  12/2012

OTHER PUBLICATIONS

Return handling options and order quantities for single period products Published by European Journal of Operational Research in Nov. 2003 (Year: 2003).*

*Primary Examiner* — Zeina Elchanti
(74) *Attorney, Agent, or Firm* — Allen, Dyer, Doppelt + Gilchrist, P.A.

(57) ABSTRACT

A product returns processing system may include mobile devices communicating respective purchase transaction receipts for respective products. The system may also include a returns processing server including a processor and a memory. The memory may store the purchase transaction receipts, for each product, a product return rule, a product availability status, and a disposition, and for each user, a return mode preference. The processor may determine a return expiration for each product based upon a respective product return rule, send a notice to each mobile device based upon a respective return window expiration, and receive a return request. The processor may, when the request is received before a return expiration, determine a product availability and condition, determine a return address based upon the disposition and at least one of the product availability and condition, and generate a label with the return address and based upon the return mode preference.

16 Claims, 4 Drawing Sheets

(56) References Cited

U.S. PATENT DOCUMENTS

| | | | |
|---|---|---|---|
| 2015/0186841 A1* | 7/2015 | Sar | G06Q 10/0837 |
| | | | 705/304 |
| 2018/0114228 A1* | 4/2018 | Singh | G07F 7/06 |
| 2018/0308047 A1* | 10/2018 | Wardell | G07F 7/06 |
| 2018/0349846 A1* | 12/2018 | Sever | G06K 7/10861 |

* cited by examiner

# PRODUCT RETURNS PROCESSING SYSTEM INCLUDING RETURN ADDRESS DETERMINATION BASED UPON DISPOSITION AND PRODUCT AVAILABILITY AND CONDITION AND RELATED METHODS

TECHNICAL FIELD

The present disclosure is related to the field of electronics, and more particularly, to a system for processing product returns, and related methods.

BACKGROUND

One particular aspect of a consumer's shopping experience is product return processing. A product return process may be as important as the sale of the product. For example, a user or consumer may decide whether to purchase a product and the retailer from which to purchase the product based upon the product return process or policy. A relatively difficult product return process, including a relatively short return window, may frustrate a consumer, which may result in lost sales and negative review.

From the retailer or merchant perspective, processing returns may consume a relatively large amount of resources. For example, a returned product may be used and/or damaged, which may make it unsuitable for resale within the retailer's sales channels. Thus, the retailer or merchant would consider the disposition of the returned product, which may result in increased costs to the retailer or merchant.

PCT Application Publication No. WO2012/178047 to Lerose et al. is directed to a system for processing returned items. A consumer can use an electronic device to scan an Internet directing code, such as a QR code, on the label on/in the package to review information associated with the one or more products, and/or to return the one or more products. This information can be provided through a web server of the seller or a third party, for example. If the consumer desires to return one or more of the products, the consumer can select one or more items associated with the particular order by using the electronic device to select the products on the application, website, or web page.

SUMMARY

A product returns processing system may include a plurality of mobile wireless communications devices associated with respective users and configured to communicate respective purchase transaction receipts for respective products. The product returns processing system may also include a returns processing server comprising a processor and a memory coupled thereto. The memory may be configured to store the plurality of purchase transaction receipts, for each product, a product return rule, a product availability status, and a disposition, and for each user, a return mode preference. The processor may also be configured to determine a return window expiration for each product based upon a respective product return rule and send a return window expiration notice to each mobile wireless communications device based upon a respective return window expiration. The processor may also be configured to receive a given product return request from a given mobile wireless communications device, and when the given product return request is received before a given return window expiration then determine a product availability status and product condition, determine a return address based upon the disposition, and at least one of the product availability status and the product condition, and generate a mailing label with the return address and based upon the return mode preference.

The respective purchase transaction receipts may include at least one of product identifiers for the respective products, a purchase transaction date, a purchase transaction time, a product description for the respective products, and a retailer name. The product availability status may include one of available, backordered, sold-out, discontinued, and recalled, for example.

The product return rule may include a threshold time period for which each product can be returned to a retailer for one of a refund, a product exchange, and a merchandise credit, for example. The return mode preference may include one of a print-at-home mailing label and a carrier product pickup, a print-at-home mailing label and a product drop-off at carrier location, and a print-at-carrier location mailing label and a product drop-off at a carrier location.

The product condition may include one of new, used, and defective. The disposition may include one of return-to-retailer stock, donate, send to secondary market, and dispose in landfill, for example.

The mobile wireless communications device may include display and a controller coupled thereto. The controller may be configured to display, on the display, the return window expiration notice, for example. The mobile wireless communications device may further include an input device. The controller may be configured to send the given product return request based upon the input device, for example.

A method aspect is directed to a method of processing product returns. The method may include using a plurality of mobile wireless communications devices associated with respective users to communicate respective purchase transaction receipts for respective products. The method may also include using a returns processing server that includes a memory and a processor coupled to the memory to store in the memory the plurality of purchase transaction receipts, for each product, a product return rule, a product availability status, and a disposition, and for each user, a return mode preference. The method may further include using the processor of the returns processing server to determine a return window expiration for each product based upon a respective product return rule, send a return window expiration notice to each mobile wireless communications device based upon a respective return window expiration, and receive a given product return request from a given mobile wireless communications device. When the given product return request is received before a given return window expiration then the processor may be used to determine a product availability status and product condition, determine a return address based upon the disposition, and at least one of the product availability status and the product condition, and generate a mailing label with the return address and based upon the return mode preference.

Another aspect is directed to a non-transitory computer readable medium for processing returns. The non-transitory computer readable medium may include computer executable instructions for causing a processor of a returns processing server to perform operations that include storing in a memory coupled to the processor a plurality of purchase transaction receipts for respective products and received from a plurality of mobile wireless communications devices associated with respective users, for each product, a product return rule, a product availability status, and a disposition, and for each user, a return mode preference. The non-transitory computer readable medium may also include computer executable instructions for causing the processor to perform operations that may include determining a return window expiration for each product based upon a respective product return rule, sending a return window expiration notice to each mobile wireless communications device based upon a respective return window expiration, and receiving a given product return request from a given mobile wireless communications device. When the given product return request is received before a given return window expiration then the computer executable instructions may cause the processor to perform operations that include determining a product availability status and product condition, determining a return address based upon the disposition, and at least one of the product availability status and the product condition, and generating a mailing label with the return address and based upon the return mode preference.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
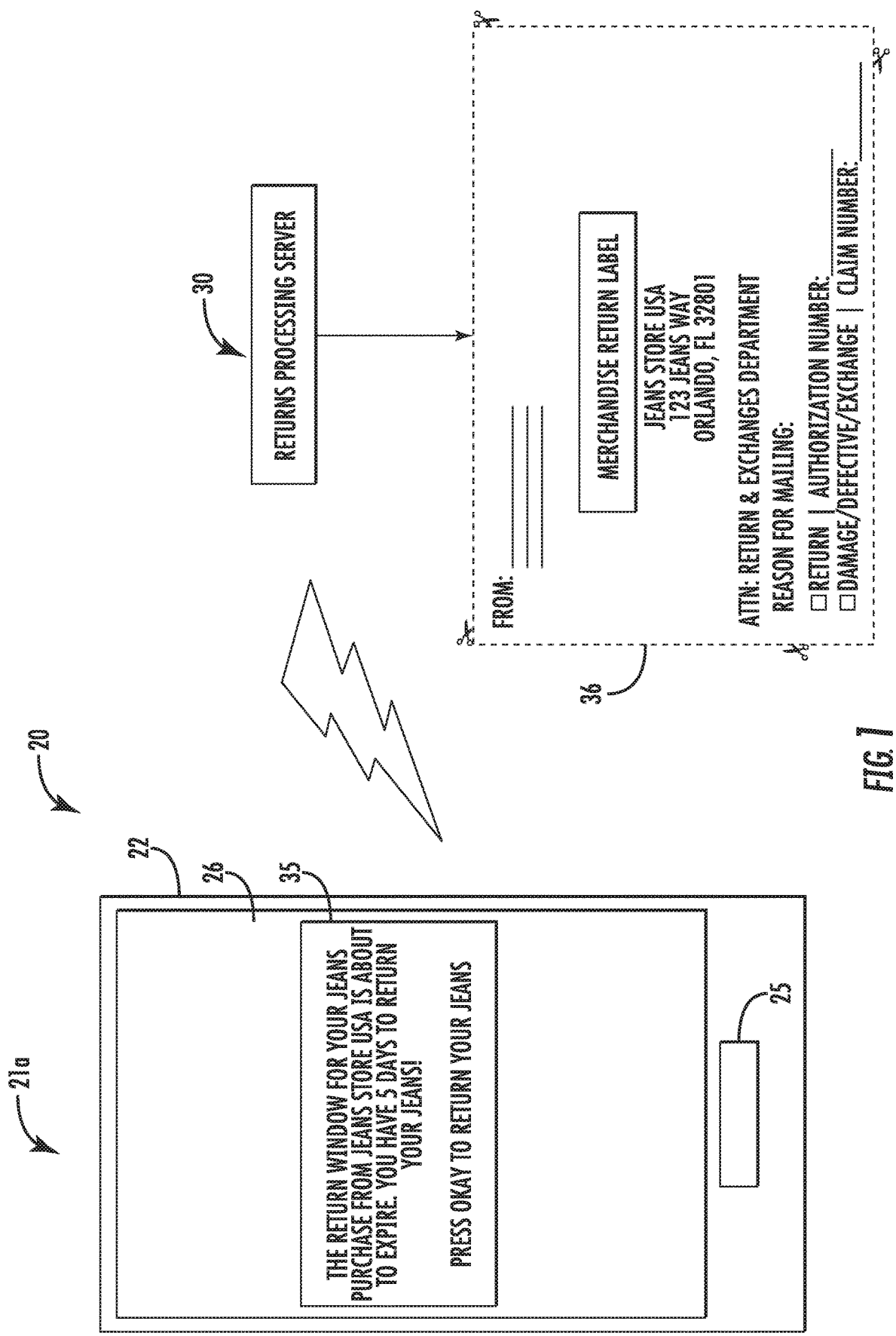
FIG. 1 is a schematic operational diagram of a product returns processing system in accordance with an embodiment.
Figure 2:
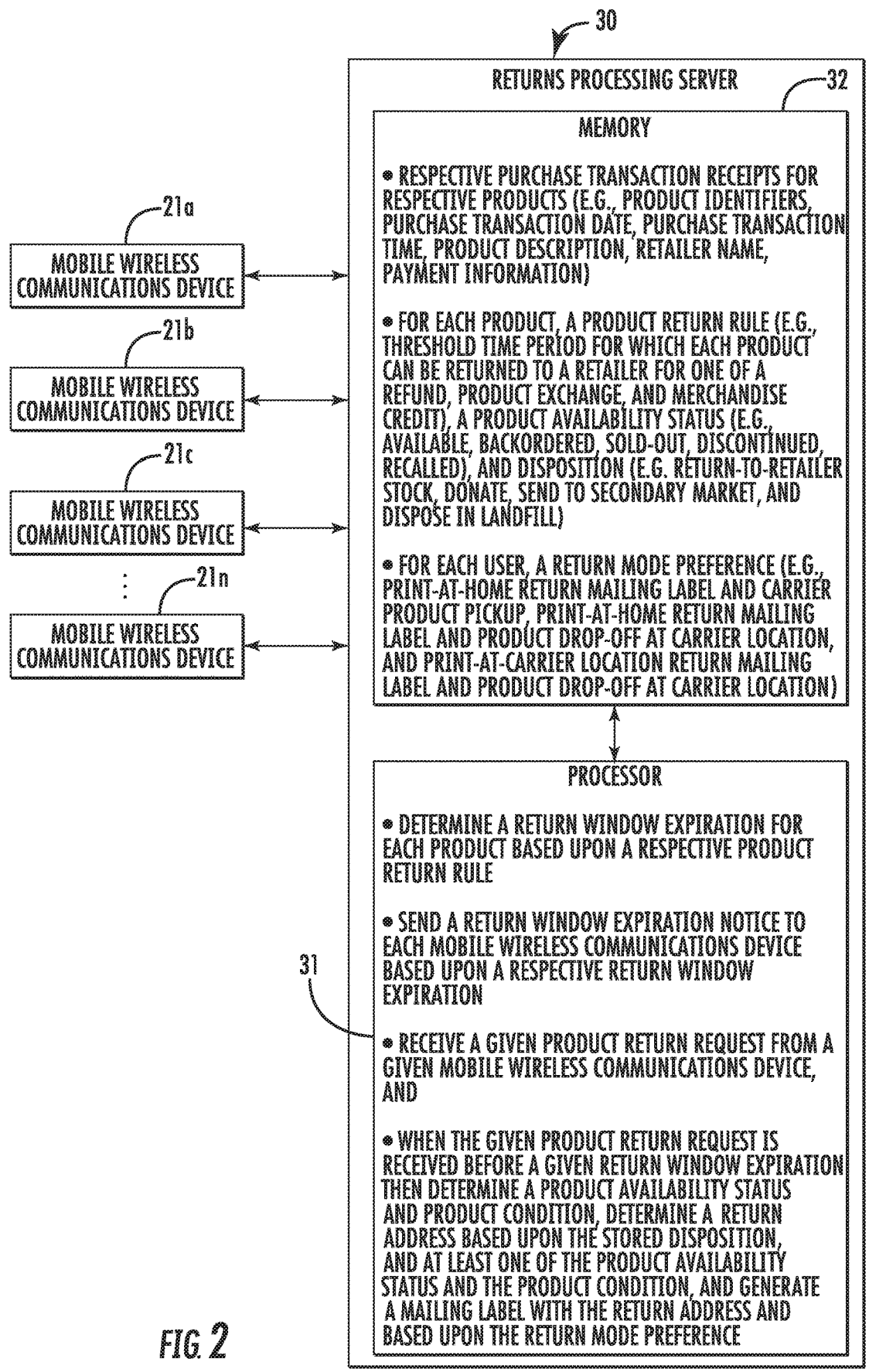
FIG. 2 is a schematic diagram of the product returns processing system of FIG. 1.
Figure 3:
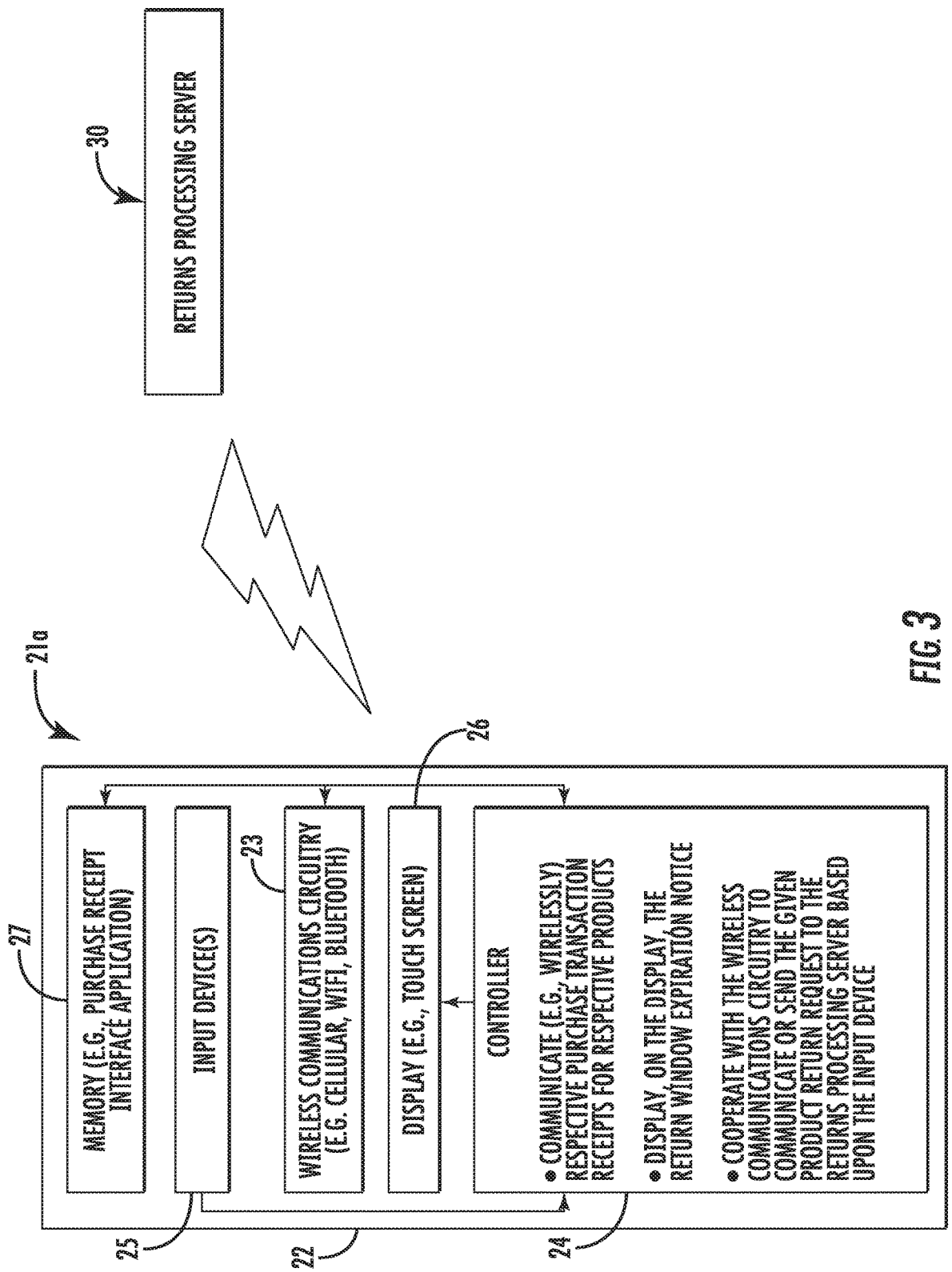
FIG. 3 is another schematic diagram of the system of FIG. 2 including a more detailed diagram of the mobile wireless communication device.
Figure 4:
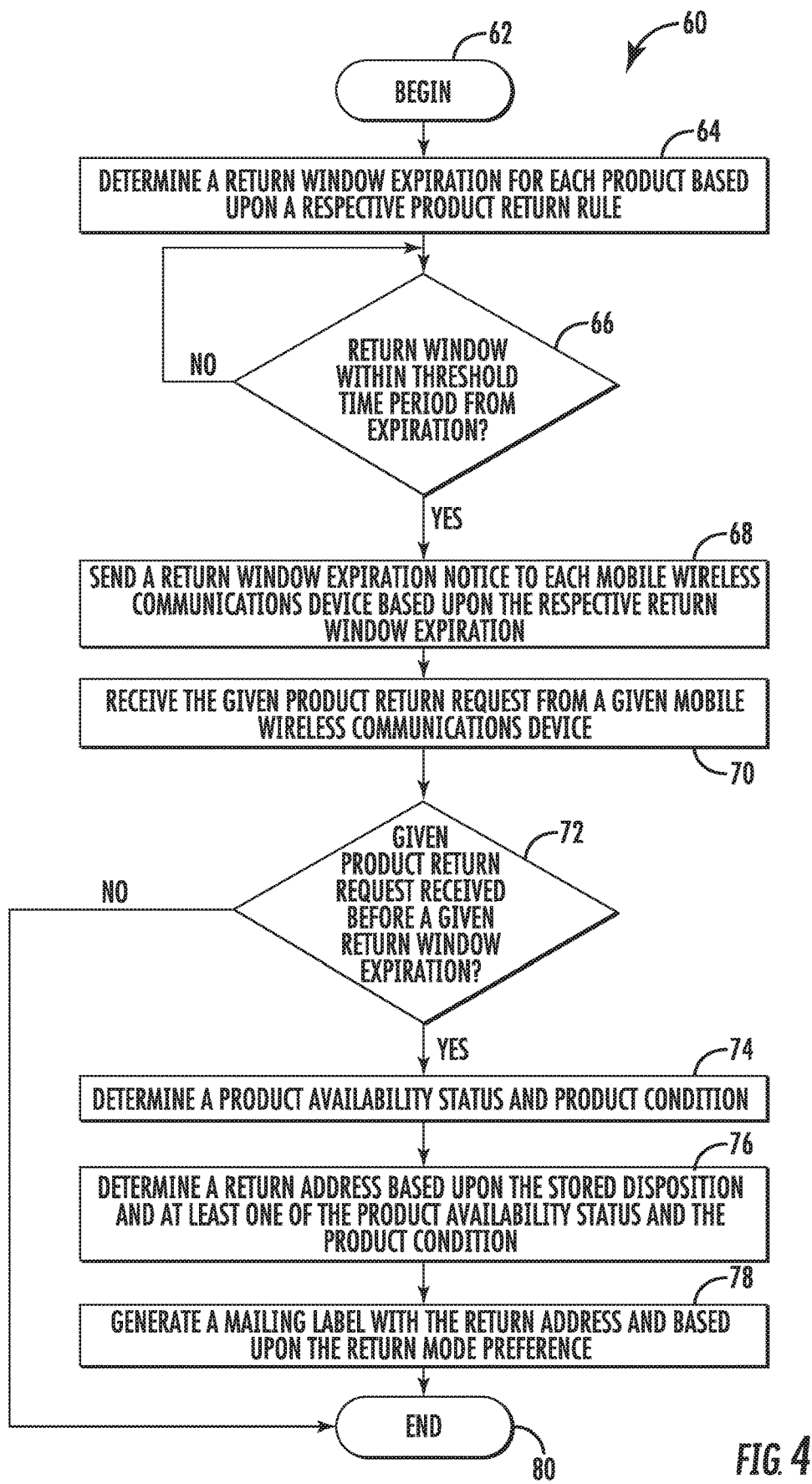
FIG. 4 is a flow chart of operation of the returns processing server of FIG. 1.

Referring initially to FIGS. 1-3, a product returns processing system 20 includes mobile wireless communications devices 21a-21n associated with respective users. The mobile wireless communications device may be a mobile telephone, for example. Of course, the mobile wireless communications devices 21a-21n may be in the form of a laptop computer, tablet computer, or other computing device.

The mobile wireless communications devices 21a-21n each include a housing 22 and wireless communications circuitry 23 carried by the housing. The wireless communications circuitry 23 may include cellular communications circuitry, WiFi circuitry, Bluetooth circuitry, and/or other wireless communications circuitry, for example. A controller 24 is carried by the housing 22 and is coupled to the wireless communications circuitry 23. The mobile wireless communications devices 21a-21n each also include an input device 25 and a display 26 coupled to the controller 24. The input device 25 may be part of the display 26, for example, in the form of a touch display. The input device 25 may be a pushbutton switch for example. Of course, there may be other and/or additional types of input device. A memory 27 is coupled to the controller 24 and stores, for example, applications.

The mobile wireless communications devices 21a-21n communicate respective purchase transaction receipts for respective products. More particularly, an application may be stored in each memory 27 that interfaces with purchase transaction processing websites, for example, via the Internet, to retrieve each receipt from a product purchase to be communicated to a returns processing server 30 for storage in a "mobile wallet" associated with the user. The application may also permit each user to create and store a user profile that includes desired product return mode preferences. For example, the desired return mode preferences may include one of a print-at-home return mailing label and a carrier product pickup, a print-at-home return mailing label and a product drop-off at a carrier location, and a print-at-carrier location return mailing label and a product drop-off at a carrier location.

The returns processing system 20 also includes a returns processing server 30 that includes a processor 31 and a memory 32 coupled thereto. The returns processing server 30 may be located remotely from any retailer, for example. The memory 32 stores purchase transaction receipts communicated, for example, wirelessly, from the mobile wireless communications devices 21a-21n. The respective purchase transaction receipts each include at least one of product identifiers for the respective products, a purchase transaction date, a purchase transaction time, a product description for the respective products, payment information, such as, for example, type, and a retailer name. The processor 31 may store the purchase transaction receipt information in the memory 32.

The memory 32 also stores, for each product, a product return rule, a product availability status, and a disposition. The product return rule includes a threshold time period for which each product can be returned to a retailer for one of a refund, a product exchange, and a merchandise credit. For example, a given product may have a 30-day return window for a full refund, and a 60-day return window for a merchandise credit. This information is included in the product return rule. It will be appreciated by those skilled in the art that the product return rule applies on a per product basis, but in some embodiments, may apply to products by a given retailer or a particular class of products (e.g., electronics). Of course, the product return rule may include additional information.

A product availability status for each product is also stored in the memory 32. The product availability status may be indicative of whether a given product is available (i.e., for sale and/or in-stock), sold-out, discontinued, recalled.

A disposition is also stored in the memory 32 for each product. For example, a given product may be disposed of by returning it to the retailer's stock, donating the product to a charity, sending the given product to a secondary or gray market for sale, and disposing the given product in a landfill. Of course, the given product may be disposed of in other and/or additional ways. The memory 32 also stores, for each user, the return mode preference, for example, that may be setup via the application on the mobile wireless communications devices 21a-21n.

Referring now to the flowchart 60 in FIG. 3, beginning at Block 62, operation of the product returns server 30 will now be described. The processor 31 determines a return window expiration for each product based upon a respective product return rule (Block 64). For example, for a given product, the product return rule may indicate a 30-day return window. Based upon the purchase date, for example, acquired from the receipt, the processor 31 determines the date of the final day for returning the given product. When the return window for the given product is within a threshold time period (Block 66), for example, a week, from expiration, the processor 31 sends a return window expiration notice 35 (FIG. 1) to each mobile wireless communications device 21a-21n based upon the respective return window expiration (Block 68). When not within the threshold time period (Block 66), the processor 31 may wait to be within threshold time period (Block 66). The return window expiration notice 35 is displayed on the display 26 of the mobile wireless communications devices 21a-21n.

A given user may choose to return the given product by generating a given product return request. The given product return request may be generated based upon the user providing input to the input device 25, for example, when the return window expiration notice is displayed on the display 26. The controller 24 of the mobile wireless communications devices 21a-21n cooperates with the wireless communications circuitry 23 to communicate the given product return request to the returns processing server 30.

The processor 31 of the returns processing server 30 receives the given product return request from a given mobile wireless communications device 21a-21n (Block 70). When the given product return request is received before a given return window expiration (Block 72) then the processor 31 determines a product availability status and product condition (Block 74). The product condition may be input by the user via the mobile wireless communications devices 21a-21n and may include any of new, used, and defective, for example. The product condition may include other and/or additional conditions. If the given product return request is received after the given return window expiration, the method ends at Block 80, as the given product is not returnable.

At Block 76, the processor 31 determines a return address based upon the disposition and at least one of the product availability status and the product condition. For example, a given user may wish to return a pair of jeans. If the jeans are discontinued, the return address may be associated with a secondary market retailer. If the jeans are still available for sale at a primary market retailer, but are used, the return address may be associated with a charity or donation receipt organization. If the jeans are still available for sale at the primary market retailer and are in new condition, then the return address may be associated with the retailer. If the jeans are damaged, regardless of whether they are discontinued, the return address may be associated with a recycling center or landfill, for example. Of course, different return addresses may be associated with different product conditions, availability status, and disposition for different products, for example, types of products (i.e., electronics, clothing, etc.). In another example, if the product to be returned has an availability status of recalled, the return address may be the recycling center or landfill regardless of the product condition. In yet another example, if the product to be returned is backordered or sold out, the return address may be that of the retailer if the product condition is new or used (i.e., there is demand for the product so a product that would otherwise go to a secondary market retailer, would go back to the primary market or original retailer).

At Block 78, the processor 31 generates a mailing label 36 with the return address and based upon the return mode preference (FIG. 1). The mailing label 36 may be for a print-at-home return mailing label for a carrier product pickup, a print-at-home return mailing label for a product drop-off at a carrier location, and a print-at-carrier location return mailing label and a product drop-off at a carrier location (i.e., instructions for the printing of the mailing label at the carrier location).

In some embodiments, the returns processing server 30, and more particularly, the processor 31 may determine a return address based upon proximity to a given return facility or destination associated with the return addresses. The returns processing server 30 may also determine the return address based upon carrier specific pricing. For example, if a given product is to be returned to the retailer and the retailer has multiple locations, the returns processing server 30 may determine which location is the closest to the given user or mailing location and/or which carrier has the lowest price, and thus determine the return address based thereon. Accordingly, shipping costs may be reduced. The method ends at Block 80.

As will be appreciated by those skilled in the art, typical prior art product return processes may be relatively long and inefficient in that returns are shipped by the user or consumer to a static or fixed central location (for all products, conditions, and availability statuses) where they are sorted and resent. The claimed embodiments streamline a technological process or the return process by eliminating the sending of all returned goods to the retailer, for example, or to a central location for sorting. In other words, in the claimed embodiments, the sorting determination is performed by the returns processing server 30 and based upon input from the user, information obtained from the respective purchase transaction receipts, and product and user information stored in the memory 32.

While a returns processing server 30 has been described herein, it should be appreciated by those skilled in the art that the functions of the returns processing server may be performed by the processor 31 based upon computer executable instructions embodied on a non-transitory computer readable medium. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A product returns processing system comprising:
a plurality of mobile wireless communications devices associated with respective users and configured to communicate respective purchase transaction receipts for respective products; and
a returns processing server comprising a processor and a memory coupled thereto, said memory configured to store
the plurality of purchase transaction receipts,
for each product, a product return rule, a product availability status, and a disposition, the product availability status comprising available for purchase at a primary market retailer, backordered, sold-out at the primary market retailer, discontinued, and recalled, and the disposition comprising return-to-retailer stock, donate to a charity, send to a secondary market retailer, and dispose in a landfill, and
for each user, a return mode preference; said processor configured to
determine a return window expiration for each product based upon a respective product return rule, send a return window expiration notice to each mobile wireless communications device for display thereon based upon a respective return window expiration, receive a given product return request for an associated product from a given mobile wireless communications device, and when the given product return request is received before a given return window expiration then cooperate with said mobile wireless communications device to obtain user input corresponding to a product condition of the associated product, the product condition being selectable from a group comprising new, used, and damaged, determine the product availability status, determine a return address based upon the disposition, the product availability status, and the product condition so when the associated product is available for purchase at a primary market retailer and the product condition is used, the return address is associated with the charity for donation, available for purchase at the primary market retailer and the product condition is new, the return address is associated with the primary market retailer for returning-to-retailer stock, one of damaged and recalled, regardless of product availability status, the return address is associated with the landfill for disposition thereat, discontinued, and the product condition is one of new and used, the return address is associated with the secondary market retailer, and one of backordered and sold-out at the primary market retailer, and the product condition is one of new and used, the return address is associated with the primary market retailer for returning-to-retailer stock, and generate a mailing label with the return address and based upon the return mode preference.

2. The product returns processing system of claim 1 wherein the respective purchase transaction receipts comprises at least one of product identifiers for the respective products, a purchase transaction date, a purchase transaction time, a product description for the respective products, and a retailer name.

3. The product returns processing system of claim 1 wherein the product return rule comprises a threshold time period for which each product can be returned to a retailer for one of a refund, a product exchange, and a merchandise credit.

4. The product returns processing system of claim 1 wherein the return mode preference comprises one of a print-at-home label and a carrier product pickup, a print-at-home label and a product drop-off at a carrier location, and a print-at-carrier location label and a product drop-off at a carrier location.

5. The product returns processing system of claim 1 wherein said mobile wireless communications device comprises an input device and a controller coupled thereto; and wherein said controller is configured to send the given product return request based upon said input device.

6. A returns processing server comprising:
a processor; and
a memory coupled to said processor and configured to store a plurality of purchase transaction receipts for respective products and received from a plurality of mobile wireless communications devices associated with respective users, for each product, a product return rule, a product availability status, and a disposition, the product availability status comprising available for purchase at a primary market retailer, backordered, sold-out at the primary market retailer, discontinued, and recalled, and the disposition comprising return-to-retailer stock, donate to a charity, send to a secondary market retailer, and dispose in a landfill, and for each user, a return mode preference; said processor configured to determine a return window expiration for each product based upon a respective product return rule, send a return window expiration notice to each mobile wireless communications device for display thereon based upon a respective return window expiration, receive a given product return request for an associated product from a given mobile wireless communications device, and when the given product return request is received before a given return window expiration then cooperate with the mobile wireless communications device to obtain user input corresponding to a product condition of the associated product, the product condition being selectable from a group comprising new, used, and damaged, determine the product availability status, determine a return address based upon the disposition, the product availability status, and the product condition so when the associated product is available for purchase at the primary market retailer and the product condition is used, the return address is associated with the charity for donation, available for purchase at the primary market retailer and the product condition is new, the return address is associated with the primary market retailer for returning-to-retailer stock, one of damaged and recalled, regardless of product availability status, the return address is associated with the landfill for disposition thereat, discontinued, and the product condition is one of new and used, the return address is associated with the secondary market retailer, and one of backordered and sold-out at the primary market retailer, and the product condition is one of new and used, the return address is associated with the primary market retailer for returning-to-retailer stock, and generate a mailing label with the return address and based upon the return mode preference.

7. The returns processing server of claim 6 wherein the respective purchase transaction receipts comprises at least one of product identifiers for the respective products, a purchase transaction date, a purchase transaction time, a product description for the respective products, and a retailer name.

8. The returns processing server of claim 6 wherein the product return rule comprises a threshold time period for which each product can be returned to a retailer for one of a refund, a product exchange, and a merchandise credit.

9. The returns processing server of claim 6 wherein the return mode preference comprises one of a print-at-home label and a carrier product pickup, a print-at-home label and a product drop-off at a carrier location, and a print-at-carrier location label and a product drop-off at a carrier location.

10. A method of processing product returns comprising:
using a returns processing server comprising a processor and a memory coupled to the processor to store
a plurality of purchase transaction receipts for respective products and received from a plurality of mobile wireless communications devices associated with respective users,
for each product, a product return rule, a product availability status, and a disposition, the product availability status comprising available for purchase at a primary market retailer, backordered, sold-out at the primary market retailer, discontinued, and recalled, and the disposition comprising return-to-retailer stock, donate to a charity, send to a secondary market retailer, and dispose in a landfill, and
for each user, a return mode preference; and using the processor to
determine a return window expiration for each product based upon a respective product return rule,
send a return window expiration notice to each mobile wireless communications device for display thereon based upon a respective return window expiration,
receive a given product return request for an associated product from a given mobile wireless communications device, and when the given product return request is received before a given return window expiration then
cooperate with the mobile wireless communications device to obtain user input corresponding to a product condition of the associated product, the product condition being selectable from a group comprising new, used, and damaged,
determine the product availability status,
determine a return address based upon the disposition, the product availability status, and the product condition so when the associated product is
available for purchase at the primary market retailer and the product condition is used, the return address is associated with the charity for donation,
available for purchase at the primary market retailer and the product condition is new, the return address is associated with the primary market retailer for returning-to-retailer stock,
one of damaged and recalled, regardless of product availability status, the return address is associated with the landfill for disposition thereat,
discontinued, and the product condition is one of new and used, the return address is associated with the secondary market retailer, and
one of backordered and sold-out at the primary market retailer, and the product condition is one of new and used, the return address is associated with the primary market retailer for returning-to-retailer stock, and
generate a mailing label with the return address and based upon the return mode preference.

11. The method of claim 10 wherein the respective purchase transaction receipts comprises at least one of product identifiers for the respective products, a purchase transaction date, a purchase transaction time, a product description for the respective products, and a retailer name.

12. The method of claim 10 wherein the product return rule comprises a threshold time period for which each product can be returned to a retailer for one of a refund, a product exchange, and a merchandise credit.

13. The method of claim 10 wherein the return mode preference comprises one of a print-at-home label and a carrier product pickup, a print-at-home label and a product drop-off at a carrier location, and a print-at-carrier location label and a product drop-off at a carrier location.

14. A non-transitory computer readable medium for processing returns, the non-transitory computer readable medium comprising computer executable instructions for causing a processor of a returns processing server to perform operations comprising:
storing in a memory coupled to the processor
a plurality of purchase transaction receipts for respective products and received from a plurality of mobile wireless communications devices associated with respective users,
for each product, a product return rule, a product availability status, and a disposition, the product availability status comprising available for purchase at a primary market retailer, backordered, sold-out at the primary market retailer, discontinued, and recalled, and the disposition comprising return-to-retailer stock, donate to a charity, send to a secondary market retailer, and dispose in a landfill, and
for each user, a return mode preference;
determining a return window expiration for each product based upon a respective product return rule;
sending a return window expiration notice to each mobile wireless communications device for display thereon based upon a respective return window expiration; and
receiving a given product return request for an associated product from a given mobile wireless communications device, and when the given product return request is received before a given return window expiration then
cooperating with the mobile wireless communications device to obtain user input corresponding to a product condition of the associated product, the product condition being selectable from a group comprising new, used, and damaged,
determining the product availability status,
determining a return address based upon the disposition, the product availability status, and the product condition so when the associated product is
available for purchase at the primary market retailer and the product condition is used, the return address is associated with the charity for donation,
available for purchase at the primary market retailer and the product condition is new, the return address is associated with the primary market retailer for returning-to-retailer stock,
one of damaged and recalled, regardless of product availability status, the return address is associated with the landfill for disposition thereat,
discontinued, and the product condition is one of new and used, the return address is associated with the secondary market retailer, and
one of backordered and sold-out at the primary market retailer, and the product condition is one of new and used, the return address is associated with the primary market retailer for returning-to-retailer stock, and
generating a mailing label with the return address and based upon the return mode preference.

15. The non-transitory computer readable medium of claim 14 wherein the product return rule comprises a threshold time period for which each product can be returned to a retailer for one of a refund, a product exchange, and a merchandise credit.

16. The non-transitory computer readable medium of claim 14 wherein the return mode preference comprises one of a print-at-home label and a carrier product pickup, a print-at-home label and a product drop-off at a carrier location, and a print-at-carrier location label and a product drop-off at a carrier location.

\* \* \* \* \*